United States Patent Office 2,914,469
Patented Nov. 24, 1959

2,914,469

DIETHANOLAMINE RECLAMATION

Herbert M. Anderson and Frederick C. Draemel, Concord, and Daniel J. Lyons, Martinez, Calif., assignors to Tidewater Oil Company, a corporation of Delaware Application September 11, 1957, Serial No. 683,410

5 Claims. (Cl. 208—236)

This invention relates to the purification of diethanolamine solutions and, in particular, to the elimination of organic acid contaminants from such solutions.

The invention is especially adapted to the purification of diethanolamine solutions which have been used in the regenerative removal of hydrogen sulfide from certain petroleum refinery operations. It is common practice to contact hydrocarbon streams containing hydrogen sulfide with an aqueous solution of diethanolamine. The diethanolamine solution absorbs the hydrogen sulfide and is then separated from the purified hydrocarbon stream and regenerated for continued use. This regeneration is normally accomplished by steam or heat stripping of the hydrogen sulfide from the diethanolamine solution. Such a procedure is described in U.S. Reissue Patent 18,958.

However, some refinery streams containing relatively large quantities of hydrogen sulfide also include small amounts of stronger acidic materials such as formic acid, acetic acid, thiocyanic acid, and the like. These stronger acidic materials form diethanolamine salts which are not decomposed at the temperatures encountered during the hydrogen sulfide removal. Instead, they result in the gradual depletion of the diethanolamine reagent available as a hydrogen-sulfide absorbent, and in each cycle the contamination of the diethanolamine solution is slightly increased, until a concentration is ultimately reached where the solution becomes ineffective for further $H_2S$ removal. Since diethanolamine is a relatively expensive reagent, it has been common practice to add caustic soda to the contaminated solution to free the more weakly ionized diethanolamine for further continued use as an absorbent. However, this is only a temporary expedient and ultimately results in the saturation of the diethanolamine solution with sodium salts of the formic, acetic and thiocyanic acids.

The problem solved by this invention is the satisfactory separation of the diethanolamine from the sodium salts formed by the addition of sodium hydroxide to diethanolamine which has absorbed quantities of such stronger acids. It is necessary to remove the sodium salts before they saturate the diethanolamine solution and crystallize out in the processing equipment, or else the solution must be discarded and replaced with a fresh diethanolamine solution.

Various methods have heretofore been suggested for the separation of diethanolamine absorbent from such contaminants, but all have their disadvantages. For example, while conventional steam stripping may be used to separate monoethanolamine from solutions containing nonvolatile salts, it has been found to be unsuitable for recovering diethanolamine from the sodium salts mentioned above, because the low vapor pressure of diethanolamine prevents its ready removal unless heated to such an extent that decomposition of the diethanolamine itself results.

It is also desirable to avoid a disproportionate dilution of the diethanolamine vapor by water vapor in the overhead product, resulting from excessive amounts of steam being used in an attempt to strip at lower temperature. If there is too much dilution, there will be the added expense and equipment for concentrating the diethanolamine to a usable strength by evaporating excessive quantities of the water diluent. These sodium salts melt at temperatures near or even higher than the decomposition temperature of diethanolamine. In other words, stripping has been generally unsatisfactory because the salts could not be kept in a fluid condition (i.e., melted) at a temperature below the decomposition temperature of diethanolamine.

The present invention is based on our discovery of a novel eutectic effect that can be achieved by the introduction of potassium ions into the sodium salt mixture. By adding a relatively small amount of potassium hydroxide to a contaminated diethanolamine solution already containing a larger amount of sodium salts from the earlier introduction of sodium hydroxide, the melting point of the salts may be sharply reduced to a temperature where steam stripping becomes feasible without undue dilution or decomposition of the diethanolamine. The same effect may be produced by adding sodium and potassium hydroxide in chosen proportions throughout the process, or it may be obtained in other ways. This lowering of melting point is effected, even though a substantial excess of potasisum hydroxide is added over the stoichiometric quantity required to assure complete conversion of the acids to alkali salts.

The eutectic effect is unexpected in that the reduction in the melting point produced by the presence in the mixture of a relatively small proportion of potassium ions is much greater than predictable from the relative proportion of sodium and potasisum ions. Only by mixture of both sodium and potassium hydroxides are optimum results obtainable. By such mixture it becomes possible to maintain the salts in a molten condition at a temperature low enough to avoid substantial decomposition of the diethanolamine vapor. Thus stripping, heretofore almost unmanageable, becomes quite practical.

Another important feature of the invention is that when the salt mixture is formed by using a major portion of sodium hydroxide and only a minor amount of potassium hydroxide, the materials' cost is held at a minimum even though the cost of potassium hydroxide is considerably higher than sodium hydroxide.

Still another unexpected result obtained from the mixture of sodium and potassium salts is a greatly increased smoothness or texture of the molten salts. This smoothness is quite noticeable, particularly in and around the valve where the salt is drained from the stripper. This appears to be due to a reduction in the crystal size, which results in much less interference with the free operation of the valve.

Other objects and advantages of the invention will appear from the following description which includes a preferable embodiment of the invention employing a diethanolamine-reclaiming tower as shown in the drawings wherein:

Figure 1:
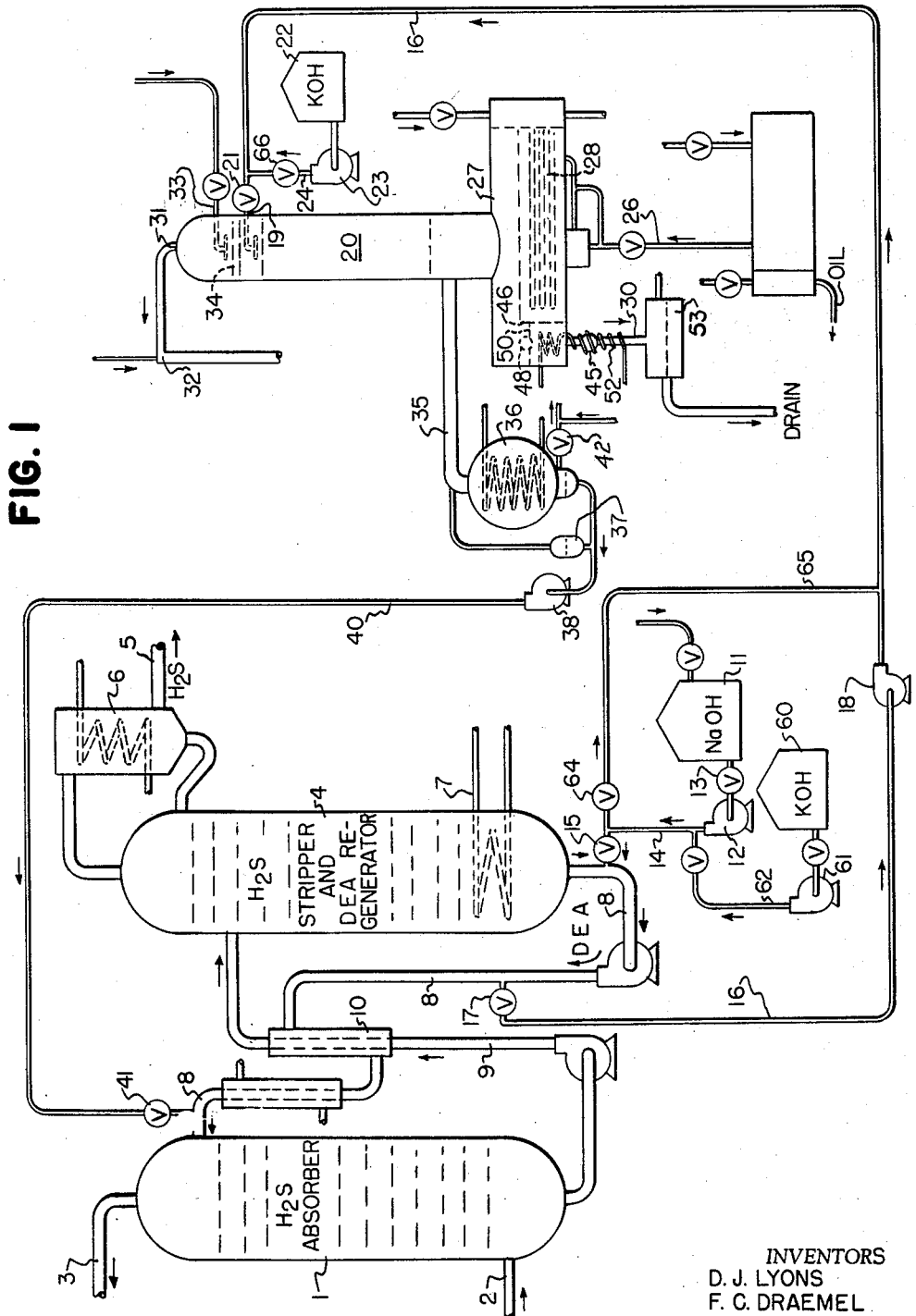
Fig. 1 illustrates in diagrammatic form a diethanolamine purification system in relationship with a hydrogen sulfide diethanolamine treating process.

In Fig. 1 the hydrogen sulfide regenerative removal process is represented by an absorber 1, having an inlet line 2 for a gaseous stream of hydrocarbons containing hydrogen sulfide along with other acid gases and an outlet line 3 for the treated hydrocarbons. A diethanolamine regenerator 4 has a hydrogen sulfide gas outlet 5 attached by means of a "knockback" condenser 6. A heater 7 supplies stripping action to the regenerator 4 and a line 8 transfers $H_2S$-lean diethanolamine solution from the regenerator 4 to the absorber 1. A transfer line 9 transfers $H_2S$-fat diethanolamine solution from the absorber 1 to the regenerator 4 through a heat exchanger 10.

Sodium hydroxide solution, as from storage tank 11, may be added to the diethanolamine solution as it becomes contaminated by the formic, acetic, thiocyanic and other acids that are present in minor but significant amount in the hydrocarbon stream. A pump 12 transfers the sodium hydroxide from the tank 11 through valve 13, line 14 and valve 15 into line 8, where it reacts with the diethanolamine salts to release the diethanolamine. However, less than an excess of sodium hydroxide is usually added in this manner.

When such an $H_2S$-absorption plant is first started with fresh diethanolamine solution, no NaOH is added. Then as the strong acids accumulate and form diethanolamine salts, the NaOH may be added continuously or intermittently to liberate the diethanolamine from such salts. A plant of suitable size may be operated in this manner for several months, but the concentration of the formate, acetate, thiocyanate, etc. ions gradually increases until finally the solution becomes too contaminated for satisfactory operation. Before the sodium salts have accumulated to such an extent that the solution becomes a slurry, separation of the diethanolamine from the contaminants is needed.

To this end, the embodiment of the invention illustrated in the drawing provides line 16 to conduct a small stream of warm, contaminated diethanolamine solution from line 8 through valve 17, pump 18, and inlet 19 into the upper portion of a reclaiming tower 20, a valve 21 being provided preferably adjacent the inlet 19. Before the contaminated solution reaches the valve 21, potassium hydroxide is metered into line 16 from storage tank 22, preferably via pump 23 and line 24. The potassium hydroxide is added in sufficient quantity to provide an excess of hydroxyl ion and to furnish sufficient potassium ion to give the desired eutectic effect, which will be explained later in detail.

A line 26 provides for the admission of superheated steam into reclaiming tower 20 through reboiler 27, which encloses heating coil 28 used to maintain the contaminants in molten state for removal through line 30. Reboiler 27 provides most of the heat required and also furnishes sufficient volume for accumulation of contaminants as a bottoms product. The superheated steam after passing through reboiler 27, rises through tower 20 to pass countercurrently to the descending diethanolamine solution introduced through inlet 19. By this action the diethanolamine solution is preheated prior to coming into contact with the molten contaminants in the reboiler.

A vent 31 at the top of the tower 20 allows for the escape of water vapor, preferably through a jet condenser 32. It is desirable to remove a large proportion of the resultant water vapor from the system through the top vent, so that the purified diethanolamine solution at the lower draw-off will have a concentration suitable for return to the hydrogen sulfide absorption system.

A small amount of cooling water entering through line 33 may be sprayed onto a demister pad 34 between inlet 19 and vent 31 to maintain the temperature of the vapors in the top of the reclaiming tower 20 within a range sufficient to prevent the overhead loss of valuable diethanolamine. As an alternative to the line 33, a "knockback" may be provided in line 31. Small amounts of cooling water injected through the line 33 wash entrained diethanolamine from the tower packing or separation trays back down the tower 20. The cooling water thus helps in controlling the temperature of diethanolamine vapors and thereby prevents the escape of small amounts of this relatively valuable reagent through the water vapor vent.

Water and diethanolamine vapors flashed by contact with the hot molten salts in reboiler 27, leave the reclaiming tower 20 through line 35 and pass to condenser 36. The condensed diethanolamine solution then returns to the main hydrogen sulfide recovery system via level controller 37 governing pump 38, and line 40 that may lead directly into line 8 as shown via a valve 41 or if desired, through a surge or storage tank (not shown). Non-condensible gas may be vented through valve 42 from a boot below condenser 36.

Figure 2:
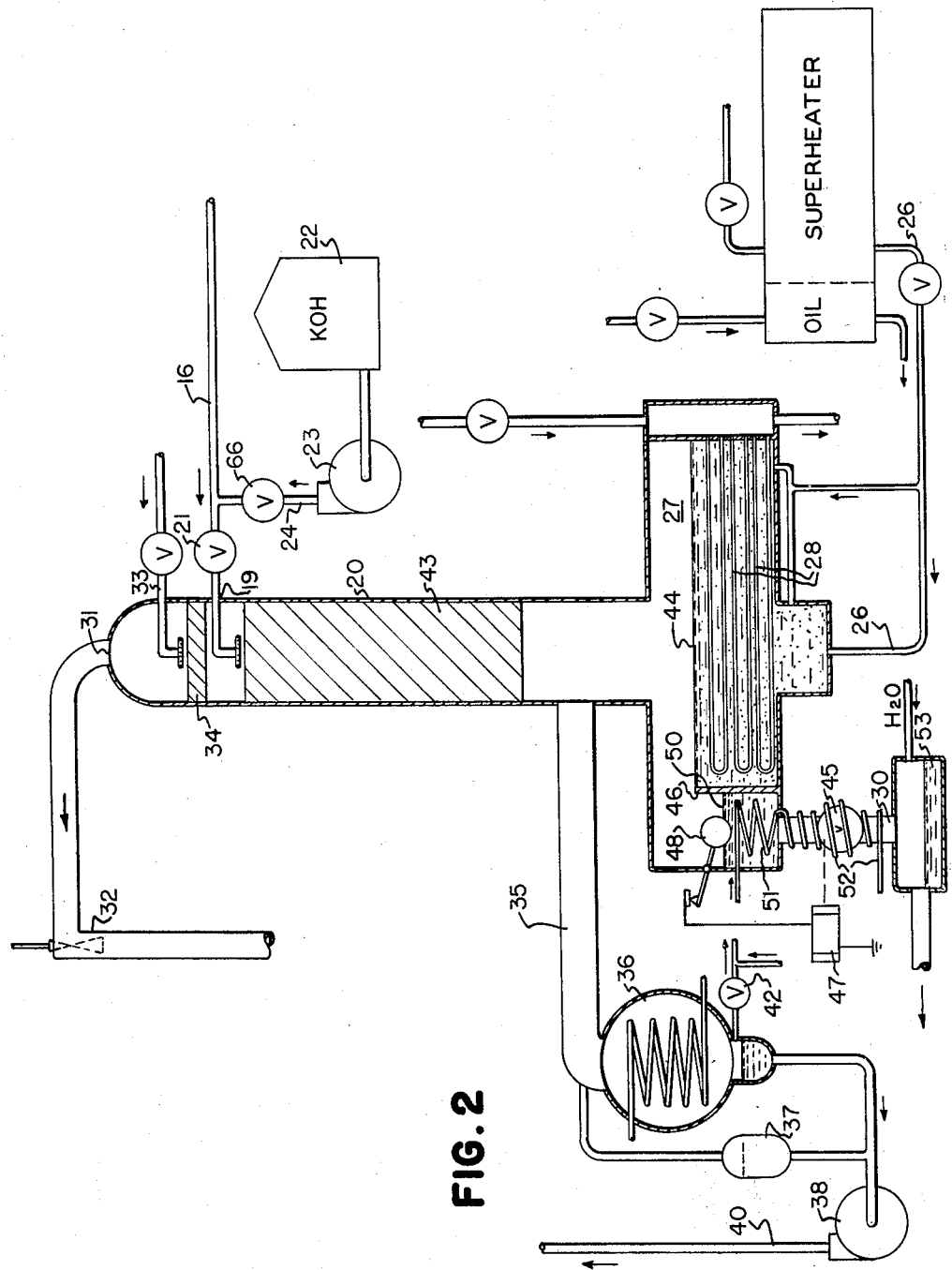
Fig. 2 is an enlarged view in elevation and section, and in diagrammatic form, of a preferred form of diethanolamine-reclaiming tower.

Fig. 2 shows the reclaiming tower 20 in more detail, with tower packing 43, such as Raschig rings. The liquid level 44 of the molten sodium and potassium salts in the reboiler 27 may be maintained by proper regulation of valve 45 located in line 30 and by weir 46. The level control valve 45 may be automatically actuated by transducer 47 controlled by a float 48 on the low-liquid level side of weir 46, in what may be termed a float chamber 50. Thus, the weir 46 maintains a level of molten salts (such as, for example, four inches) above the top of heating tubes 28, while float-controlled valve 45 keeps the molten salt in float chamber 50 below the level of weir 46 and above the top of its own heating coil 51. Heating coil 52 or other heating jacket may also be provided around the valve 45 and line 30 to keep the waste salts molten until they reach sewer 53, whence they are carried away by water.

The invention may be illustrated by its application to a typical hydrogen sulfide recovery unit wherein about 300,000 gallons per day of diethanolamine solution are circulated through the absorber-stripper unit 1, 4 to treat refinery gases containing about 35 tons per day of hydrogen sulfide. During the circulation of diethanolamine through this unit, the relatively strong acids, such as formic, acetic, thiocyanic, and the like, present in small quantities in the refinery gases, form fairly stable products with the diethanolamine. Sodium hydroxide at about 30° Baumé is added from time to time or slowly and continuously (e.g., an average of about 35 gallons per day of 25% aqueous NaOH) to the solution to "free" the diethanolamine for repeated use until excessive amounts of sodium salts finally render the absorbent diethanolamine solution so contaminated that precipitation is incipient.

To decompose the remaining diethanolamine formate, etc., potassium hydroxide may be added from line 24 up to a ratio of about 5–50 parts of potassium ion by weight to 95–50 parts of sodium ion already present. Preferably, the ratio of potassium ion to sodium ion does not exceed 1 to 2, which is about the same as a ratio of added hydroxides of about 1 to 3. However, if desirable, KOH and NaOH may be added in approximately equal quantities.

Figure 3:
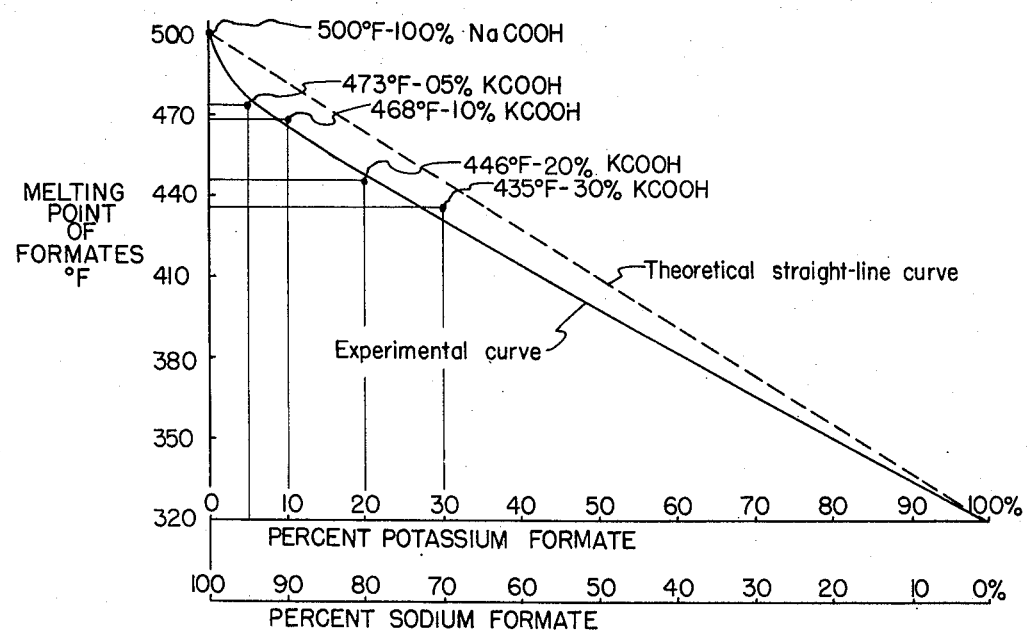
Fig. 3 is a curve indicating the melting points of mixtures of sodium and potassium formates relative to the proportions thereof in the mixtures.

The result on the composite salts is quite surprising, for the melting point of the salt mixture does not change lineally in direct proportion to the relative proportions of the mixture, but, apparently, eutectically. For example, Fig. 3 shows a plot of test data. The vertical axis shows the melting point of salt comprising a mixture of various proportions of sodium formate and potassium formate, the percentages of each being plotted along the horizontal axis. The eutectic effect is compared with the straight line connecting the 500° F. melting point of 100% sodium formate with the 320° F. melting point of 100% potassium formate. Thus, the addition of only 5% of potassium formate reduced the melting point of the mixture to 473° F. instead of 491° F., which would have been the melting point if the curve followed the straight line. Similarly, the mixture of 10% KCOOH and 90% NaCOOH melted at 468° F. instead of 482° F., as the straight line would anticipate; the mixture of 20% KCOOH and 80% NaCOOH melted at 446° F. instead of 464° F.; and the mixture of 30% KCOOH and 70% NaCOOH melted at 435° F. instead of at 446° F. Thus the experimental data showed a differential of 18° at 5% KCOOH, 14° at 10% KCOOH, 18° at 20% KCOOH, and 11° at 30% KCOOH.

Figure 4:
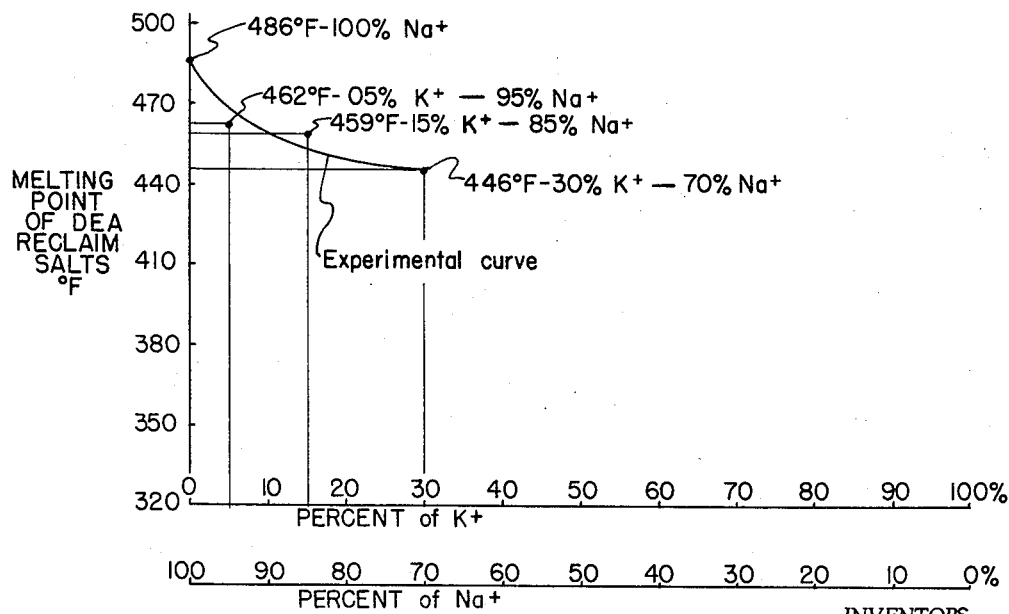
Fig. 4 is a similar curve for an actual plant salt, including not only the predominant formates but also acetates, thiocyanates, and other contaminants produced in actual commercial practice of the invention. Here, the melting points are plotted against the proportions by weight of the sodium and potassium ions to each other.

Fig. 4 shows test data on actual plant salts similarly plotted, except that the percentages represent the weight proportions of the sodium and potassium ions to each other. The difference between the curve of Fig. 4 and that of Fig. 3 is believed to be largely due to the presence of acetates and thiocyanates. It will be noted that the 100% sodium salts melted at 486° F., while the presence of even 5% potassium ions lowered the melting point to 462° F.—low enough to permit stripping off the diethanolamine without substantial decomposition. When additional potassium hydroxide was added, 15% K+ ions reduced the melting point to about 459° F. and 30% K+ ions reduced it to 446° F., according to the experimental data. This indicates that the best practical results are obtained with between 5% and 30% K+ ions, as against between 95% and 70% Na+ ions.

A preferred way of taking advantage of the novel eutectic phenomenon is to operate for about four months by adding NaOH until the solution is quite contaminated with the sodium salts and then to add to the solution KOH to give an excess of hydroxyl ions and feed the solution immediately to the reclaimer tower 20. After one or two months of substantially continuous operation, the reclaimer tower can be shut down for another four months or so.

*Example 1*

Diethanolamine solution, which had been used for about four months to remove $H_2S$ from refinery hydrocarbon gases in an absorber-desorber system, such as is illustrated in Fig. 1 by vessels 1 and 4 and interconnected piping, had gradually absorbed during that time about 2 pounds per gallon of acids substantially stronger than $H_2S$. These stronger acids were mainly formic acid, although acetic, propionic and thiocyanic acids were identified therein. As the acids gradually accumulated, NaOH solution had been added from time to time (such as from storage tank 11 in Fig. 1) to release the diethanolamine from the diethanolamine salts of the strong acids and to form the corresponding sodium salts.

After absorption of 2 pounds per gallon of the acids, and the addition of sufficient NaOH to neutralize somewhat more than half of them, the diethanolamine solution had become so contaminated that reclamation of the diethanolamine was indicated. To this end, a stream of about 30 gallons (containing about 200 lbs. water, about 23 lbs. free D.E.A., about 27 lbs. of D.E.A. combined with about 12 lbs. of acids, and about 72 lbs. of Na salts) per hour of $H_2S$-lean solution was withdrawn from the absorber-desorber system and charged to the reclaimer, as illustrated by line 16 and pump 18. Prior to introduction into the reclaimer, about 2.6 gallons per hour of 48° Bé. KOH from line 24 was mixed with the contaminated D.E.A. stream (equivalent to about 15.5 lbs. KOH and 17 lbs. $H_2O$), which amount was about 7% in excess of that required to combine with all the acids not already combined with NaOH. This excess alkali is desirable to insure complete decomposition of the D.E.A. salts. Thus, in 30 gallons of solution there resulted approximately 72 pounds of sodium salts, 22 pounds of potassium salts and 1 pound of excess caustic.

The thus neutralized solution was injected at a temperature of about 150° F. into the reclaimer as illustrated in Fig. 2 by pipe 19 and tower 20 to descend, countercurrently to ascending water vapor, and enter into reboiler 27 where the solution came in contact with a pool of about 350 pounds of salts maintained in the molten state by indirect heat (as from heating coils 28 supplied with 600° F. heating oil) and by superheated steam supplied at the rate of 350 pounds per hour through pipe 26. Contact with the molten pool and with the superheated steam instantly flashed off the D.E.A. and water, leaving the Na and K salts in the pool.

Under these conditions, a vapor stream of purified D.E.A. mixed with steam was drawn off through line 35 and condensed in condenser 36 to yield a liquid stream of about 10% D.E.A. solution amounting to about 60 gallons per hour. This condensed stream was reinjected into the $H_2S$ absorber-desorber system (as illustrated by pipe 40 in Fig. 1). Since the returned stream of reclaimed D.E.A. solution forms a relatively small part of the volume undergoing continuous stripping in $H_2S$ stripper 4, the fact that it is somewhat more dilute than the normal D.E.A. solution does not materially affect the D.E.A. concentration of the latter. The small amount of excess water thus introduced is ultimately eliminated from the system by withdrawing water from condenser 6.

Residue potassium and sodium salts of the organic acids, accumulating in the pool, were withdrawn over weir 46 through valve 45 and thence to sewer 53 at the rate of about 90–100 pounds per hour. These salts analyzed about 11 parts K+, 24 parts Na+, and 60 parts acid-radicals.

Excess steam introduced into the reclaimer was withdrawn at the rate of about 120 pounds per hour from the top through the line 31. A water spray of about 3 gallons per hour was supplied through the line 33.

During these operations, the temperature of the molten pool was maintained at about 450°–460° F., i.e., slightly above the melting point of the salts (about 445° F.) At this temperature, little, if any, decomposition of the D.E.A. occurred during the short time it was exposed to these temperatures. Withdrawal of the accumulated molten salts through the level control valve 48 was easily maintained and the recovered D.E.A. solution was clear.

*Example 2*

The advantage of using KOH in combination with the NaOH, to free the D.E.A. from the organic acids, is illustrated by a similar run in the same equipment as used in the above Example 1. Conditions were maintained the same except that (1) instead of the 15.5 lbs. per hour of KOH which were injected into the solution entering reclaimer 20, an equivalent amount of NaOH (11 lbs.) was added through line 65, resulting in a correspondingly slightly decreased yield of salts discharged to the sewer, and (2) the temperature of the salt pool in the reboiler had to be maintained above about 490° F. in order to keep it molten. At this temperature, considerable decomposition of the D.E.A. was noticed, the stream of reclaimed solution at times was black and had to be discarded, and operation of the level control valve 48 became irregular, apparently due to the presence of crystallized salts.

When starting operations, with the reboiler 27 empty, lower temperatures—at first around 350° F.—are maintained until the salts build up. After a short period of operation, molten salts in a saturated solution accumulate as bottoms product in the reclaiming tower 20 and may be withdrawn at a steady rate.

While in the foregoing there are described the preferred embodiments of the invention which have been found in practice to give satisfactory and reliable results, it is to be understood that the same is susceptible of modification in various particulars without departing from the spirit or scope of the invention or sacrificing any of its advantages. For instance, the temperatures, flow rates, and concentration may vary to a limited degree with the process still retaining its advantages. The invention may be applicable to periodic use as well as to continuous operation. While strong caustic (47° Baumé) would be advantageous to use as a neutralizing agent because of the minimum amount of water thereby introduced into the system, it is usually preferable to use more dilute material (e.g., 30° Baumé) because of ease in handling and storage and avoidance of solidification at reduced temperatures anticipated in cold weather operation.

It is to be understood that, although we prefer to use NaOH to neutralize the strong acids and extend the life of the diethanolamine solution during the $H_2S$ removal operations, and to add the required amounts of KOH to the exhausted solution just prior to the reclaiming operations, the proper amounts of NaOH and KOH can be added at any time desired. For example, the entire amounts of both alkalies can be added prior to withdrawal of diethanolamine solution from the $H_2S$ absorber-desorber system. Alternately, NaOH and KOH in proper proportions can be used to neutralize the strong acids during the $H_2S$ removal operations, and NaOH (or a mixture of NaOH and KOH) added to the stream entering the reclaiming operations, for final neutralization and excess. As may be obvious to the operator, if such should be desired, the entire amounts of NaOH and KOH could be added to the stream entering the reclaimer.

Thus, in lieu of adding the caustic potash to the $H_2S$-lean diethanolamine solution in the stream 16 leading to the reclaiming tower, it may be added directly to the diethanolamine absorbent in the absorber-stripper system. As shown in Fig. 1, there may be a KOH storage tank 60, with pump 61 and line 62 leading into the line 14. The pumps 61 and 12 may meter the two hydroxides in amounts sufficient to "free" the diethanolamine from its combination with contaminating materials, by replacing the combined diethanolamine with sodium and potassium ions, thereby forming the mixture of sodium and potassium salts. The resulting metal salts are then circulated through the absorber-stripper system and eventually drawn off through the side stream 16 to the reclaiming tower 20 where they are removed as bottoms products. If insufficient sodium ions happen to be present, additional sodium hydroxide can be added via valve 64 and line 65. More potassium hydroxide may be added from line 24 through valve 66, which in this modification, would normally be closed.

Although we have described the invention in relation to a specific form of reclaiming apparatus, the invention is valuable in conjunction with any form of apparatus used for stripping D.E.A. from alkali salts where the alkali salts are removed from the apparatus in molten condition.

Likewise, in describing the invention, we have illustrated its use in relation to a hydrogen sulfide removal process wherein hydrocarbon streams are treated in the vapor phase with aqueous diethanolamine for the removal of hydrogen sulfide, with formic acid and/or other relatively strong acids being concomitantly absorbed along with the hydrogen sulfide from the gaseous hydrocarbon stream. However, in some refinery operations, hydrogen sulfide is removed from similar hydrocarbon streams by contacting them in the liquid phase with aqueous diethanolamine. When these liquid streams contain acids relatively stronger than $H_2S$, the diethanolamine solution will become similarly contaminated and can be recovered in the same manner as we have described.

While relatively strong acidic contaminants such as formic and acetic acids are generally encountered in these types of absorption operation, the invention is also useful in separating other similar acidic contaminants.

We claim:

1. In a process wherein diethanolamine is recovered as distillate by steam distillation from an aqueous solution containing sodium salts of formic, acetic and thiocyanic acids, which remain as a substantially anhydrous molten residue, the improvement which comprises maintaining the melting point of said residue below the decomposition point of diethanolamine by providing in said solution potassium salts of the same acids in ratio between about 1:1 and 1:20 to said sodium salts.

2. In a process wherein an aqueous diethanolamine solution contaminated with diethanolamine salts of formic, acetic and thiocyanic acids is mixed with at least sufficient alkali to combine with all of said acids and is then steam-stripped to remove as vapor the diethanolamine and water and leave the alkali salts as a molten residue, from contact with which additional amounts of said diethanolamine and water are volatilized, the method of maintaining the melting point of said alkali salts below the decomposition temperature of diethanolamine which comprises adding sodium hydroxide to said solution as about 50% to 95% of said alkali and adding potassium hydroxide as the remainder of said alkali, thereby producing a mixture of potassium and sodium salts of desired melting point.

3. In a process wherein an aqueous diethanolamine solution obtained from the contacting of hydrocarbon gases during the regenerative removal of $H_2S$ and contaminated with diethanolamine salts of acids stronger than $H_2S$ resulting from said contacting is mixed with sufficient alkali to combine with all of said acids and is then steam-stripped to remove as vapor the diethanolamine and water and leave the resulting alkali salts as a molten residue, from contact with which additional amounts of said diethanolamine and water are volatilized, the method of maintaining the melting point of said alkali salts below about 465° F. which comprises adding sodium hydroxide to said solution as 70% to 95% of said alkali and adding potassium hydroxide as the remainder of said alkali.

4. The process of claim 3 where most of the sodium hydroxide is added during the use of the diethanolamine solution in the treatment of the hydrocarbon gases.

5. In a process wherein petroleum fractions containing relatively large amounts of hydrogen sulfide and relatively small amounts of stronger acids essentially from the group consisting of formic, acetic and thiocyanic acids are contacted with aqueous diethanolamine solution to remove, by chemical reaction, said hydrogen sulfide and said stronger acids, said diethanolamine solution being regenerated by steam-stripping said hydrogen sulfide therefrom but said stronger acids not being removable by said stripping, the exhaustion of the diethanolamine by the gradual formation of salts with said stronger acids being retarded by adding sodium hydroxide with the resultant accumulation of sodium salts of said stronger acids in a contaminated solution; the method of obtaining reusable diethanolamine solution free from said sodium salts, comprising adding potassium hydroxide in quantities between one-half and one-twentieth of the amount of said sodium hydroxide previously added, the total hydroxide being in substantial excess over that required to free the diethanolamine from its said salts by replacing its ions with those of sodium and potassium; injecting a stream of the resultant solution containing uncombined diethanolamine and sodium and potassium salts of said stronger acids into the upper portion of a reclaiming zone to pass downwardly through said zone; maintaining a hot pool consisting principally of said sodium and potassium salts of said stronger acids in a molten state between 440° F. and 465° F. below said zone, toward which said stream passes and at the surface of which said diethanolamine and water are immediately vaporized; injecting steam into said pool and passing said steam upwardly therethrough and through said zone counter-currently to said stream; withdrawing a mixture of diethanolamine vapor and water above the level of said pool; condensing the withdrawn vapors to an aqueous solution of substantially pure diethanolamine; and returning the withdrawn diethanolamine to said process for treating petroleum fractions.

References Cited in the file of this patent

UNITED STATES PATENTS

Re. 18,958    Bottoms _____ Sept. 26, 1933
2,701,750    Paulsen et al. _____ Feb. 8, 1955